(12) United States Patent
Woerner et al.

(10) Patent No.: US 12,173,885 B1
(45) Date of Patent: Dec. 24, 2024

(54) LIGHTING SYSTEM FOR A VACUUM CLEANER NOZZLE

(71) Applicants: John Woerner, Spring Hill, TN (US); Drew Shipps, Spring Hill, TN (US)

(72) Inventors: John Woerner, Spring Hill, TN (US); Drew Shipps, Spring Hill, TN (US)

( * ) Notice: Subject to any disclaimer, the term of this patent is extended or adjusted under 35 U.S.C. 154(b) by 0 days.

(21) Appl. No.: 18/334,674

(22) Filed: Jun. 14, 2023

(51) Int. Cl.
| | | |
|---|---|---|
| F21V 3/00 | (2015.01) | |
| A47L 9/00 | (2006.01) | |
| F21S 9/02 | (2006.01) | |
| F21V 33/00 | (2006.01) | |
| H02J 50/10 | (2016.01) | |
| F21Y 113/10 | (2016.01) | |
| F21Y 115/10 | (2016.01) | |

(52) U.S. Cl.
CPC ............ *F21V 33/0044* (2013.01); *F21S 9/02* (2013.01); *H02J 50/10* (2016.02); *F21Y 2113/10* (2016.08); *F21Y 2115/10* (2016.08)

(58) Field of Classification Search
CPC ......... F21V 33/0044; F21S 9/02; H02J 50/10; F21Y 2113/10; F21Y 2115/10; A47L 9/30; A47L 9/2884; A47L 11/00; A47L 13/00
See application file for complete search history.

(56) References Cited

U.S. PATENT DOCUMENTS

| | | | | |
|---|---|---|---|---|
| 2007/0240275 | A1* | 10/2007 | Willenbring | A47L 9/30 |
| | | | | 15/324 |
| 2012/0272473 | A1* | 11/2012 | Griffith | A47L 9/0416 |
| | | | | 15/339 |
| 2016/0037985 | A1 | 2/2016 | Schultz et al. | |
| 2016/0037989 | A1 | 2/2016 | Theising et al. | |
| 2019/0097448 | A1* | 3/2019 | Partovi | H02J 7/0013 |
| 2020/0076934 | A1* | 3/2020 | Boatner | H04B 1/3833 |
| 2021/0259401 | A1* | 8/2021 | Rivera | A46B 15/0022 |
| 2023/0059745 | A1* | 2/2023 | Jacobowitz | F21S 9/02 |

FOREIGN PATENT DOCUMENTS

WO    WO-2023152127 A1 *   8/2023    ............... A47L 5/24

* cited by examiner

*Primary Examiner* — Tracie Y Green
(74) *Attorney, Agent, or Firm* — Invention Matters LLC; Edwin De Angel

(57) ABSTRACT

A lighting system attached to a vacuum cleaner nozzle, comprises a light source including one or more Light Emitting Diodes (LEDs) adapted to illuminate a surface to be cleaned, and an electric circuit electrically coupled to the light source and configured to provide power to the light source from a rechargeable battery. The rechargeable battery is configured to be wirelessly charged by a wireless charging station.

20 Claims, 7 Drawing Sheets

LIGHTING SYSTEM FOR A VACUUM CLEANER NOZZLE

TECHNICAL FIELD

The present invention relates generally to lighting systems for cleaning purposes, and more specifically to a lighting system attached to a vacuum cleaner.

BACKGROUND ART

Vacuum cleaners are used in both industrial and domestic settings to clean surfaces and objects. The vacuum cleaners are designed to generate a vacuum at an end of a cleaning nozzle that is proximate to a surface of an object to be cleaned. The vacuum available at the end of the cleaning nozzle draws in debris, dust or liquids and the same are then deposited in a dustbag or a cyclone for later disposal. In certain circumstances, such as low light conditions, identifying the debris to be cleaned on the surface while using the vacuum cleaner can pose challenges. Some of the vacuum cleaners in that regard are provided with lighting attachments attached to the cleaning nozzle. However, the lighting attachments available in the market generally have to be charged via a cord which makes them cumbersome to use while in operation.

Therefore there is a need in the art for lighting systems to be attached to a vacuum cleaner nozzle that does not suffer from the aforementioned deficiencies.

OBJECTS OF THE INVENTION

Some of the objects of the invention are as follows:

One object of the invention is to provide a lighting system that is capable of being attached to a nozzle of a vacuum cleaner.

Another object of the invention is to provide a lighting system that is capable of being charged wirelessly.

Another object of the invention is to provide a lighting system that includes one or more light-emitting diodes (LEDs) configured to emit white light and full-color RGB (Red/Green/Blue) light.

Another object of the invention is to provide a lighting system wherein irradiation characteristics of a light source can be controlled using an electric circuit.

Another object of the invention is to provide a lighting system that is waterproof and dustproof.

Another object of the invention is to provide a lighting system that can communicate with an external communication device.

SUMMARY OF THE INVENTION

The present invention provides a lighting system that can be attached to a vacuum cleaner nozzle to improve visibility and cleaning efficiency. The lighting system comprises a light source, an electric circuit for controlling the light source, a rechargeable battery for storing electrical energy, and a wireless charging element for charging the battery. The lighting system can be a single white light or a combination of full-color RGB lighting elements and can be enclosed within a housing attached to the vacuum cleaner nozzle and sealed with clear epoxy to ensure waterproofing. The battery can be any commercially available rechargeable battery, and the wireless charging element uses inductive charging to provide a stable flow of current to the device.

The electric circuit connects each component and provides power to the lighting system from the battery. It also enables the charging of the battery when power is received from the wireless charging element and can dim or disable the lighting system while charging. If the lighting system uses full-color lighting elements, the circuit can change the output color by adjusting the voltage of the red, green, and blue components of the LEDs, or by sending a control signal to digitally controlled LEDs. The lighting system and electric circuit can be integrated into a single printed circuit board and affixed to the nozzle assembly. Overall, this invention provides a practical and efficient solution for enhancing visibility during vacuuming in low-light conditions.

According to an aspect of the present invention, there is provided a lighting system attached to a vacuum cleaner nozzle. The lighting system includes a light source including one or more Light Emitting Diodes (LEDs) adapted to illuminate a surface to be cleaned, and an electric circuit electrically coupled to the light source and configured to provide power to the light source from a rechargeable battery. The rechargeable battery is configured to be wirelessly charged by a wireless charging station.

In one embodiment of the invention, the wireless charging station comprises a power transmitting coil and the electric circuit comprises a power receiving coil.

In one embodiment of the invention, the one or more Light Emitting Diodes (LEDs) are configured to emit white light and/or full-color RGB (red/green/blue) light.

In one embodiment of the invention, the electric circuit is configured to send a control signal to the light source to change a color of light emanating from the one or more LEDs.

In one embodiment of the invention, the rechargeable battery is a lithium polymer battery.

In one embodiment of the invention, the wireless charging station uses Qi wireless charging or Bluetooth wireless charging method.

In one embodiment of the invention, the electric circuit is configured to dim or disable the light source while the rechargeable battery is being charged.

In one embodiment of the invention, the lighting system is made waterproof and dustproof.

In one embodiment of the invention, the light source and the electric circuit are integrated into a single printed circuit board affixed to the vacuum cleaner nozzle.

In one embodiment of the invention, the lighting system is detachably attached with the vacuum cleaner nozzle.

In one embodiment of the invention, the lighting system is adapted to change the illumination angle.

In one embodiment of the invention, the lighting system is adapted to communicate with an external communication device.

In one embodiment of the invention, the electric circuit is adapted to change the intensity of light according to ambient light.

In one embodiment of the invention, the light source automatically turns on when removed from the wireless charging station.

In one embodiment of the invention, the wireless charging station have a rechargeable battery unit.

According to a second aspect of the present invention, there is provided a method for illuminating a surface to be cleaned. The method includes providing a vacuum cleaner nozzle. Further, the method includes attaching a lighting system to the vacuum cleaner nozzle. The lighting system includes a light source including one or more Light Emitting Diodes (LEDs), and an electric circuit electrically coupled to the light source. The method further includes providing, by the electric circuit, power to the light source from a rechargeable battery. Also, the method includes charging, wirelessly, the rechargeable battery by a wireless charging station.

In one embodiment of the invention, the method further comprises sending, by the electric circuit, a control signal to the light source to change a color of light emanating from the one or more LEDs.

In one embodiment of the invention, the method further comprises changing, by the electric circuit, an intensity of illumination according to the ambient light.

In one embodiment of the invention, the method further comprises communicating, by the electric circuit, with an external communication device.

In one embodiment of the invention, the method further comprises receiving, by the electric circuit, an input signal from the external communication device, and modifying, by the electric circuit, irradiation characteristics of the light source in response to the received input signal.

BRIEF DESCRIPTION OF THE ACCOMPANYING DRAWINGS

The accompanying drawings illustrate the best mode for carrying out the invention as presently contemplated and set forth hereinafter. The present invention may be more clearly understood from a consideration of the following detailed description of the preferred embodiments taken in conjunction with the accompanying drawings wherein like reference letters and numerals indicate the corresponding parts in various figures in the accompanying drawings, and in which.

DETAIL DESCRIPTION

Figure 1:
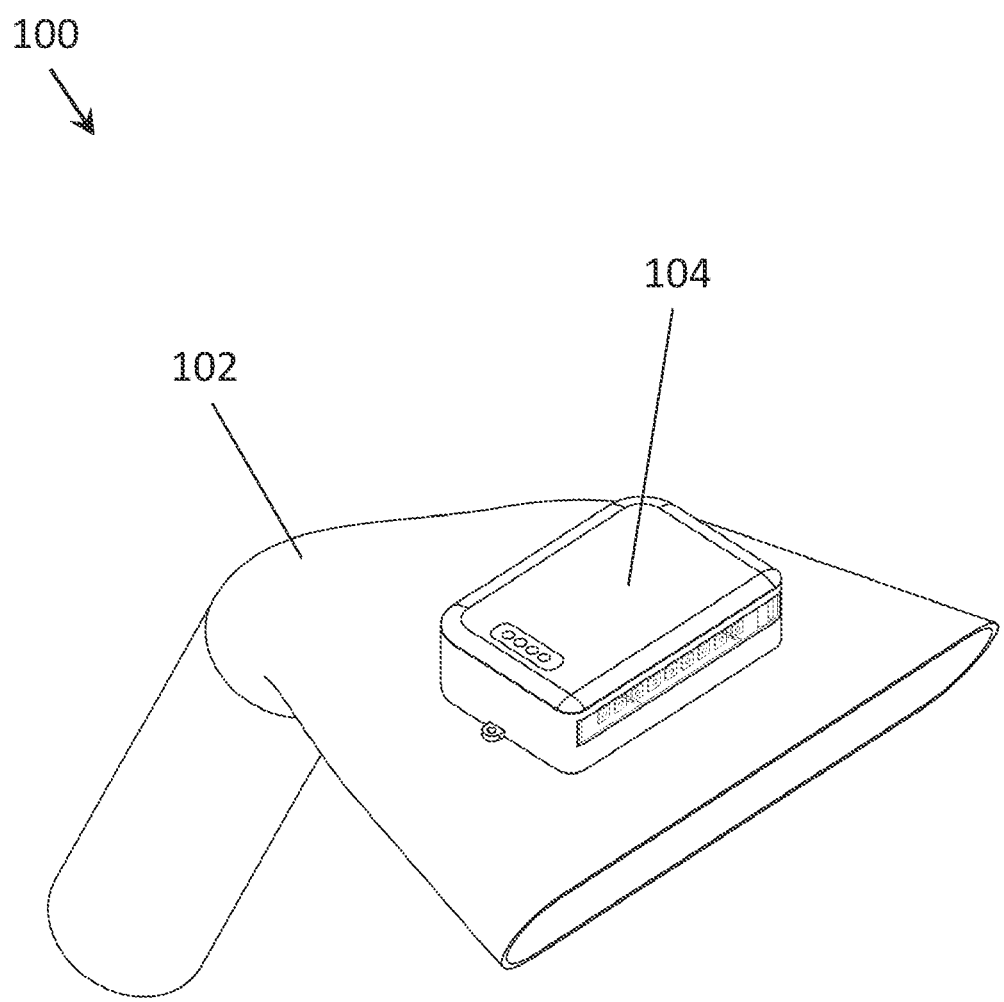
FIG. 1 illustrates an assembly of a lighting system and a vacuum cleaner nozzle, in accordance with an embodiment of the present invention.

Embodiments of the present invention disclosure will be described more fully hereinafter with reference to the accompanying drawings in which like numerals represent like elements throughout the figures, and in which example embodiments are shown.

The detailed description and the accompanying drawings illustrate the specific exemplary embodiments by which the disclosure may be practiced. These embodiments are described in detail to enable those skilled in the art to practice the invention illustrated in the disclosure. It is to be understood that other embodiments may be utilized, and other changes may be made, without departing from the spirit or scope of the present disclosure. The following detailed description is therefore not to be taken in a limiting sense, and the scope of the present invention disclosure is defined by the appended claims. Embodiments of the claims may, however, be embodied in many different forms and should not be construed as limited to the embodiments set forth herein.

In the context of the specification, the term "processor" refers to one or more of microprocessors, a microcontroller, a general-purpose processor, a Field Programmable Gate Array (FPGA) or an Application Specific Integrated Circuit (ASIC), and the like.

In the context of the specification, the phrase "memory unit" refers to one or more of a volatile storage memory, such as Static Random Access Memory (SRAM) and Dynamic Random Access Memory (DRAM) of types such as Asynchronous DRAM, Synchronous DRAM, Double Data Rate SDRAM. Rambus DRAM, and Cache DRAM, etc., or a non-volatile storage memory such as EPROM, EEPROM or flash memory or the like.

In the context of the specification, the phrase "communication interface" refers to a device or a module enabling direct connectivity via wires and connectors such as USB. HDMI, VGA, or wireless connectivity such as Bluetooth or Wi-Fi or Local Area Network (LAN) or Wide Area Network (WAN) implemented through TCP/IP. IEEE 802.x, GSM, CDMA. LTE or other equivalent protocols.

In the context of this specification, terms like "light", "radiation", "irradiation", "emission" and "illumination", etc. refer to electromagnetic radiation pertaining to the visible light part of the electromagnetic spectrum. The wavelengths of electromagnetic radiation in that regard would vary between 380 nm to 700 nm.

In the context of the specification, "Light Emitting Diodes (LEDs)" are envisaged to be characterized by their superior power efficiencies, smaller sizes, rapidity in switching, physical robustness, and longevity when compared with incandescent or fluorescent lamps. In that regard, the plurality of LEDs may be through-hole type LEDs (generally used to produce electromagnetic radiations of red, green, yellow, blue and white colors), Surface Mount LEDs, Bicolor LEDs, Pulse Width Modulated RGB (Red-Green-Blue) LEDs, and high-power LEDs, etc.

Materials used in the one or more LEDs may vary from one embodiment to another depending upon the frequency of radiation required. Different frequencies can be obtained from LEDs made from pure or doped semiconductor materials. Commonly used semiconductor materials include nitrides of Silicon, Gallium, Aluminum, and Boron, and Zinc Selenide, etc. in pure form or doped with elements such as Aluminum and Indium, etc. For example, red and amber colors are produced from Aluminum Indium Gallium Phosphide (AlGaInP) based compositions, while blue, green, and cyan use Indium Gallium Nitride based compositions. White light may be produced by mixing red, green, and blue lights in equal proportions, while varying proportions may be used for generating a wider color gamut. White and other colored lightings may also be produced using phosphor coatings such as Yttrium Aluminum Garnet (YAG) in combination with a blue LED to generate white light and Magnesium doped potassium fluorosilicate in combination with blue LED to generate red light. Additionally, near Ultraviolet (UV) LEDs may be combined with europium-based phosphors to generate red and blue lights and copper and zinc doped zinc sulfide-based phosphor to generate green light.

In addition to conventional mineral-based LEDs, one or more LEDs may also be provided on an Organic LED (OLED) based flexible panel or an inorganic LED-based flexible panel. Such OLED panels may be generated by depositing organic semiconducting materials over Thin Film Transistor (TFT) based substrates. Further, discussion on generation of OLED panels can be found in Bardsley, J. N (2004). "International OLED Technology Roadmap", IEEE Journal of Selected Topics in Quantum Electronics, Vol. 10, No. 1, that is included herein in its entirety, by reference. An exemplary description of flexible inorganic light-emitting diode strips can be found in granted U.S. Pat. No. 7,476,557 B2, titled "Roll-to-roll fabricated light sheet and encapsulated semiconductor circuit devices", which is included herein in its entirety, by reference.

In several embodiments, the one or more LEDs may also be micro-LEDs described through U.S. Pat. Nos. 8,809,126 B2, 8,846,457 B2, 8,852,467 B2, 8,415,879 B2, 8,877,101 B2, 9,018,833 B2 and their respective family members, assigned to Nth Degree Technologies Worldwide Inc., which are included herein by reference, in their entirety. The one or more LEDs, in that regard, may be provided as a printable composition of the micro-LEDs, printed on a substrate.

It is envisaged that a lighting system be provided that is capable of being removably attached to a vacuum cleaner nozzle of a vacuum cleaner, to illuminate a surface or an object that is being cleaned using the vacuum cleaner. In that regard, the lighting system is envisaged to include a light source including several Light Emitting Diodes (LEDs). The LEDs may be configured to emit white light and full-color RGB (red/green/blue) light. The lighting system is further envisaged to include an electric circuit electrically coupled to the light source, in a manner that the electric circuit is configured to power the light source from a rechargeable battery. The rechargeable battery may be configured to be charged wirelessly by a wireless charging station. In that regard, the electric circuit may include a power receiving coil to receive an oscillating magnetic field generated by a power transmitting coil of the wireless charging station. Referring to the drawings, the present invention will now be discussed in more detail.

FIG. 1 illustrates an assembly 100 of a lighting system 104 and a vacuum cleaner nozzle 102, in accordance with an embodiment of the present invention. In one embodiment of the invention, the lighting system 104 is detachably attached to the vacuum cleaner nozzle 102. The lighting system 104 in that regard may be attached to the vacuum cleaner nozzle 102 through threaded fasteners, such as screws, bolts, and nuts. Alternately, the lighting system 104 may be attached to the vacuum cleaner nozzle 102 through a key and slot mechanism. The lighting system 104 may also be attached to the vacuum cleaner nozzle 102 through a snap-fit arrangement, such as through a cantilever snap-fit arrangement, a torsion snap-fit arrangement, or a U-shaped snap-fit arrangement.

Figure 2:
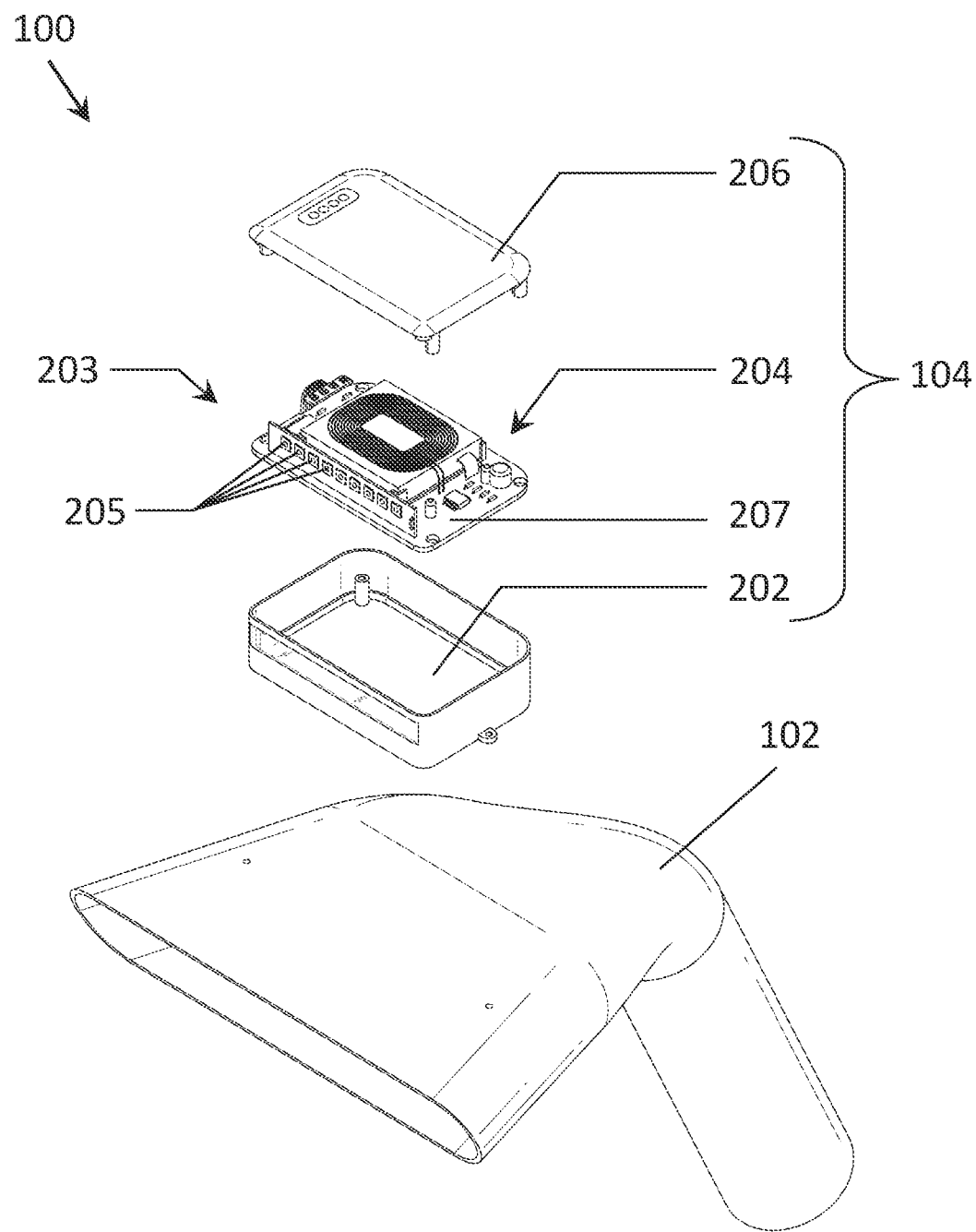
FIG. 2 illustrates an exploded view of the assembly of FIG. 1, in accordance with an embodiment of the present invention.

FIG. 2 illustrates an exploded view of the assembly 100 of FIG. 1, in accordance with an embodiment of the present invention. The lighting assembly 104 includes a housing 202 and a housing cover 206. Encapsulated between the housing 202 and the housing cover 206 is a light source 203, an electric circuit 204, and a Printed Circuit Board (PCB) 207. In one embodiment of the invention, the light source 203 and electric circuit 204 are integrated into the single PCB 207 affixed to the vacuum cleaner nozzle 102. In several alternate embodiments of the invention, the light source 203 may be provided separately from the PCB 207 and be electrically coupled to the PCB 207 through electrical conductors such as electrical wires and/or cables. The lighting assembly 104 may be made waterproof and dustproof by applying a clear epoxy adhesive or a seal or a gasket between the housing 202 and the housing cover 206.

The light source 203 includes one or more LEDs 205 adapted to illuminate a surface to be cleaned. The one or more LEDs 205 may be arranged in a single row or several rows or columns making a matrix of LEDs. In another embodiment, the one or more LEDs 205 may be arranged in a circular cluster. In yet another embodiment, the one or more LEDs 205 may be arranges in a zig-zag pattern allowing individual beams from individual LEDs of the one or more LEDs 205 to overlap with each other and provide an enhanced effective illumination. In several embodiments of the invention, the one or more LEDs 205 are configured to emit white light and/or full-color RGB (red/green/blue) light.

Figure 3:
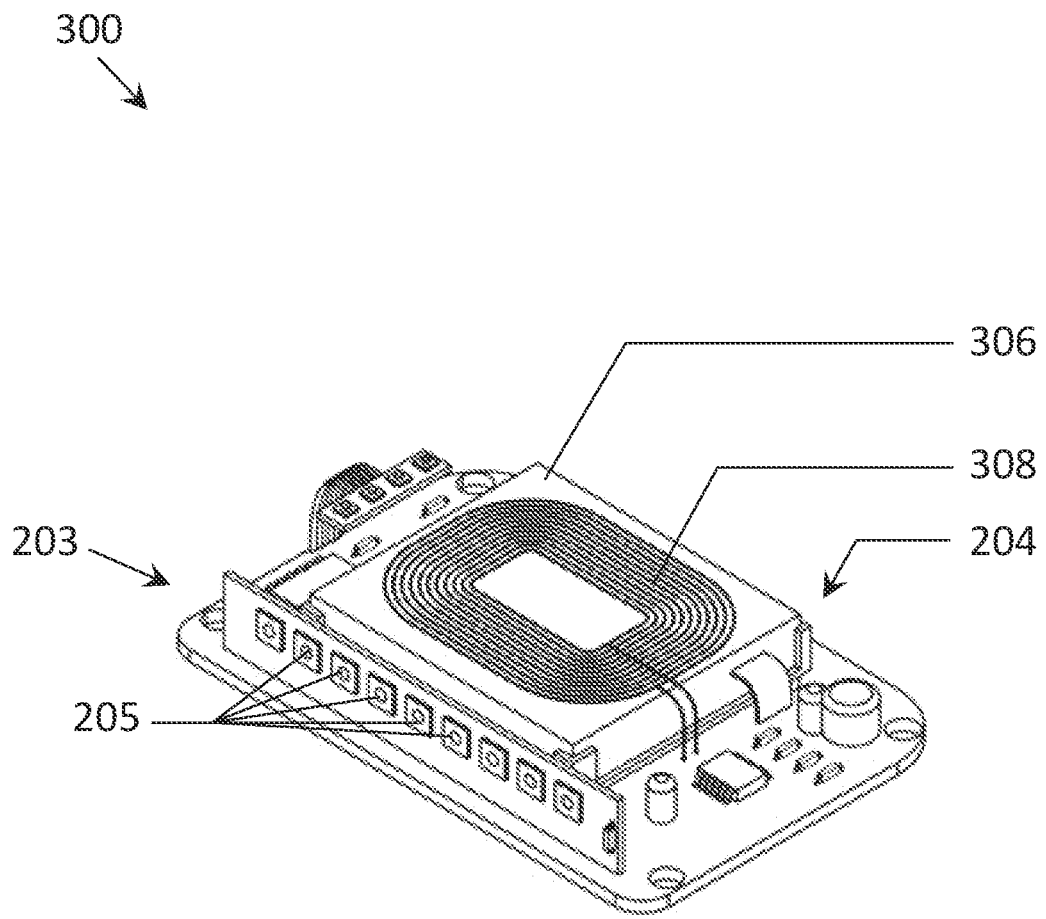
FIG. 3 illustrates an assembly of a light source, an electric circuit, and a Printed Circuit Board (PCB) of the lighting system, in accordance with an embodiment of the present invention.

FIG. 3 illustrates an assembly 300 of the light source 203, the electric circuit 204 and the PCB 207 of the lighting system 104, in accordance with an embodiment of the present invention. The electric circuit 204 includes a rechargeable battery 306 and a power receiving coil 308. The electric circuit 204 is electrically coupled to the light source 203. Further, the electric circuit 204 is configured to provide power to the light source 203 from the rechargeable battery 306. In that regard, the rechargeable battery 306 may be selected from a group consisting of Nickel-Metal Hydride batteries, Lithium-ion batteries, and Lithium-polymer batteries. The power receiving coil 308 is configured to receive magnetic power from a power transmitting coil of a wireless charging station (See FIG. 4), to generate electrical current to wirelessly charge the rechargeable battery 306.

In several embodiments of the invention, the electric circuit 204 is configured to send a control signal to the light source 203 to change a color of light emanating from the one or more LEDs 205. The electric current 204 in that regard may include a processor and a memory unit. The memory unit may be programmed with machine-readable instructions which would enable the processor to generate the control signal and transmit the control signal to the light source 203. In one embodiment of the invention, the one or more LEDs 205 are RGB LEDs. In such a scenario, the control signal will cause voltages being supplied to the red, green and blue components of the one or more LEDs 205 to change the output color. In an alternate embodiment of the invention, the one or more LEDs 205 are digitally controlled LEDs (for example, WS2812 LEDs). In such a scenario, the control signal will cause the change in color of the output light according to WS2812 protocol.

In addition, the processor of the electric circuit 204 may also be configured to change the illumination angle of the light source 203 by moving linearly or rotating the light source 203 using an actuator. The electric circuit 204 through the processor may also be configured to change the intensity of the light emanating from the light source 203 according to the ambient light. In an example embodiment, the electric circuit 204 is provided with an ambient light sensor (not shown). The ambient light sensor may generate a voltage signal in correlation with the intensity of the ambient light and transmit the generated voltage to the processor of the electric circuit 204. The processor may then regulate the voltage and the current being supplied to the light source 203 to modify the intensity of the light generated by the light source 203 in correlation with the intensity of the ambient light. For example, if the intensity of the ambient light is relatively higher and artificial illumination may not be required, the processor may then keep the light source 203 deactivated. In another example embodiment, the intensity of the ambient light may be very low and a significant amount of artificial illumination be required to illuminate the surface to be cleaned. The processor, in that scenario, may cause a higher value of current and/or voltage to be applied to the light source 203 to achieve a relatively higher value of illumination.

Figure 4:
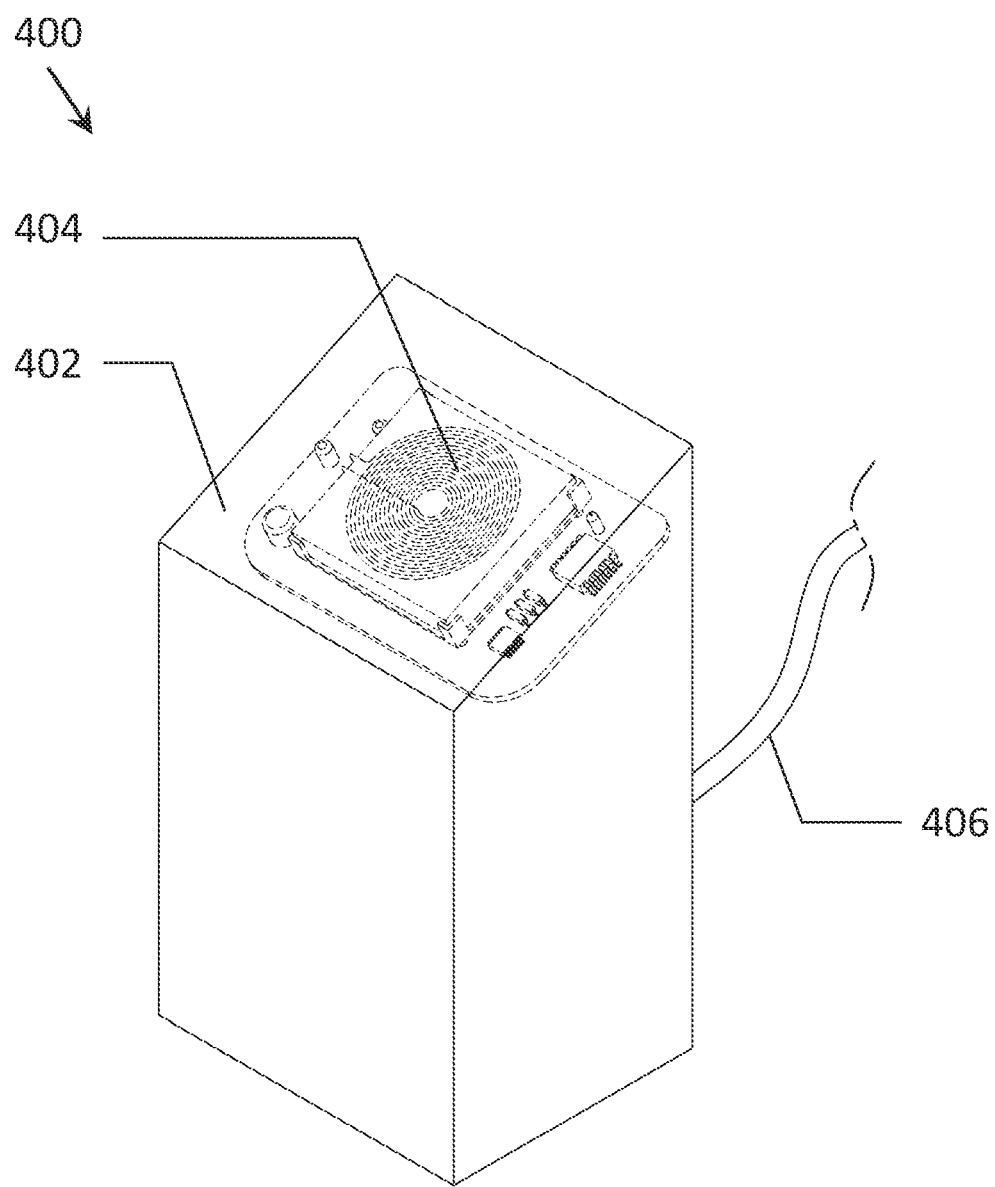
FIG. 4 illustrates a wireless charging station for wirelessly charging a rechargeable battery of the lighting system, in accordance with an embodiment of the present invention.

FIG. 4 illustrates a wireless charging station 400 for wirelessly charging the rechargeable battery 306 of the lighting system 104, in accordance with an embodiment of the present invention. The wireless charging station 400 includes a charging surface 402 and a power supply cord 406. The charging surface 402 is adapted to receive a device or a system with a rechargeable battery, for wirelessly charging the rechargeable battery of the device or the system. The power supply cord 406 is configured to provide electrical power to the wireless charging station 400. In one embodiment of the invention, the wireless charging station 400 is configured to generate an oscillating magnetic field to wirelessly charge the device or the system.

In that regard, the wireless charging station 400 may include a power transmitting coil 404 that is configured to convert the electrical power supplied by the power supply cord 406 into magnetic power by generating the oscillating magnetic field. In one embodiment, the power transmitting coil 404 is directly connected to the power supply cord 406. In another embodiment, the wireless charging station 400 may include a rechargeable battery that may be charged by the power supply cord 406, and the power transmitting coil 404 may use the electrical power stored in the rechargeable battery to generate the oscillating magnetic field.

A power receiving coil, such as the power receiving coil 308 of the lighting system 104 may couple with the oscillating magnetic field to convert the magnetic energy into electrical energy used for charging the rechargeable battery 306. In that regard, the wireless charging station 400 may be configured to wirelessly charge the rechargeable battery 306 as per Qi wireless charging standard developed by the Wireless Power Consortium. In an alternate embodiment of the invention, the wireless charging station 400 may be configured to charge the rechargeable battery 306 through Bluetooth wireless charging method.

Figure 5:
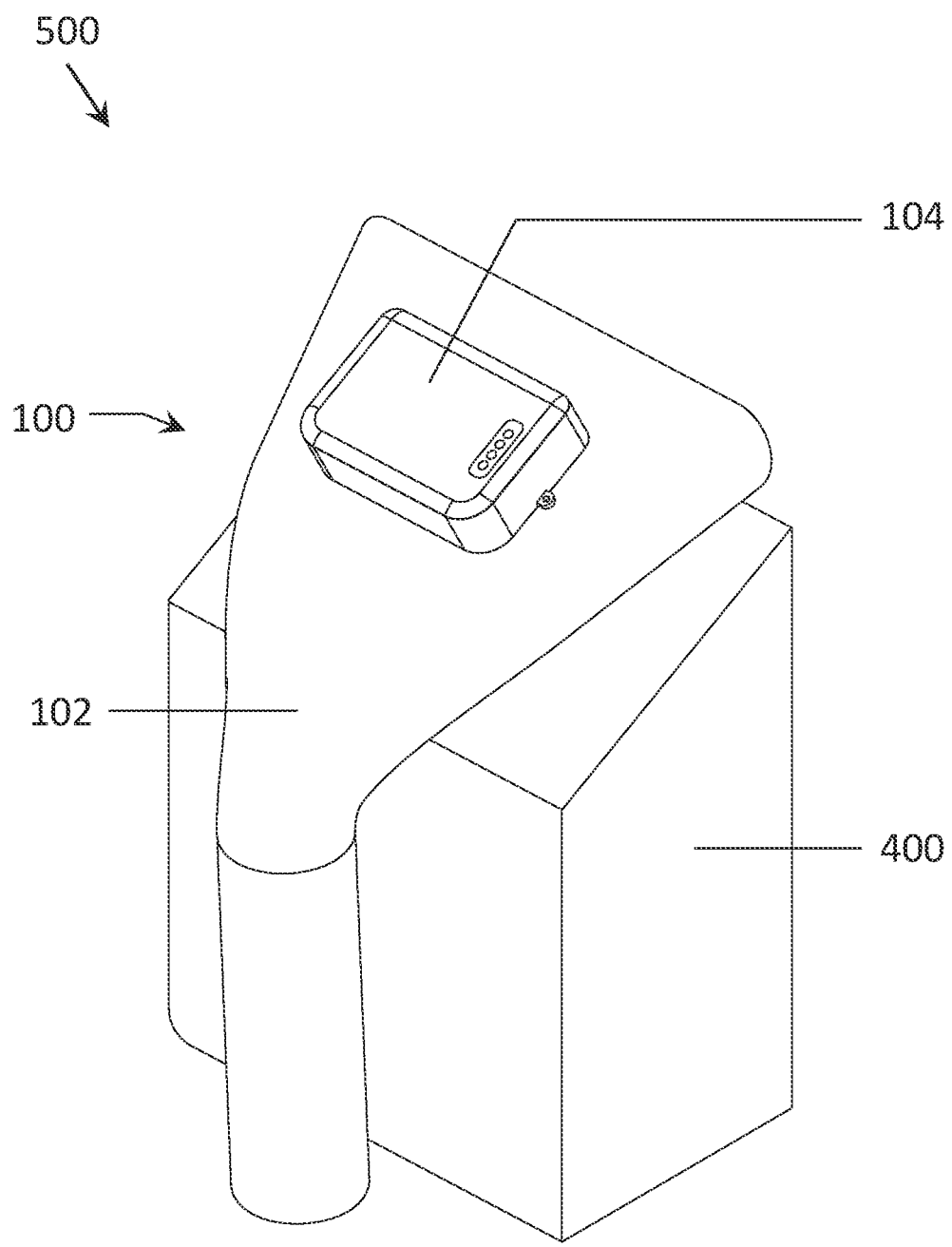
FIG. 5 illustrates an arrangement depicting wireless charging of the lighting system by the wireless charging station, in accordance with an embodiment of the present invention.

FIG. 5 illustrates an arrangement 500 depicting the wireless charging of the lighting system 104 by the wireless charging station 400, in accordance with an embodiment of the present invention. The lighting system 104 may be charged by locating the vacuum cleaner nozzle 102 over the charging surface 402. The power receiving coil 306 of the lighting system 104 would then come in contact with the oscillating magnetic field generated by the power transmitting coil 404 of the wireless charging station 400, and generate electrical current to charge the rechargeable battery 306. In one embodiment of the invention, the electric current 204 is configured to dim or disable the light source 203, to save power, and/or prevent any interference of the light being emitted, with the oscillating magnetic field, while the rechargeable battery 306 is being charged by the wireless charging station 400. Moreover, in one embodiment of the invention, the electric circuit 204 may be configured to automatically turn on the light source 203 when the assembly 100 is removed from the charging surface 402 of the wireless charging station 400.

Figure 6:
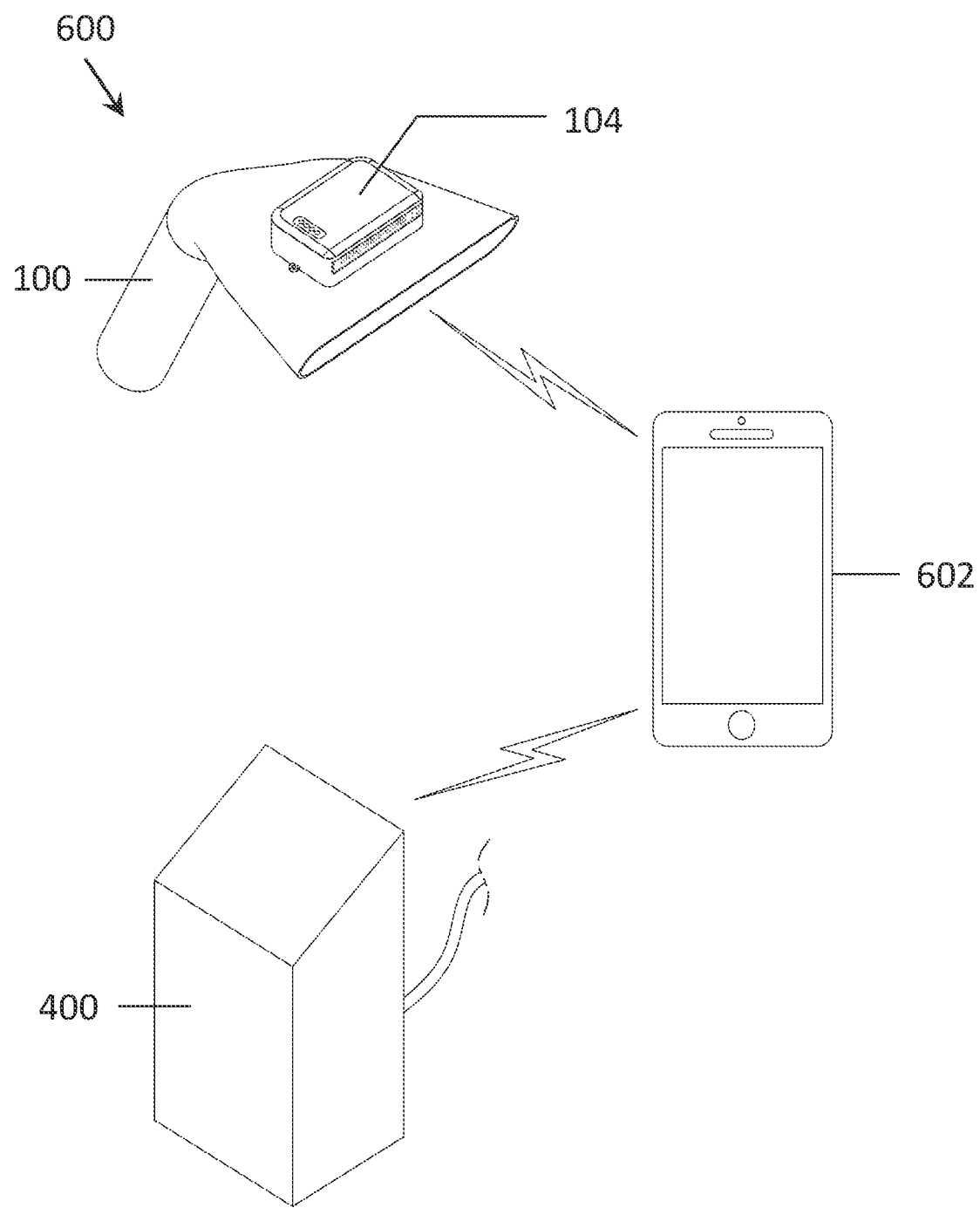
FIG. 6 illustrates a communication network depicting the lighting system and the wireless charging station in communication with an external communication device.

FIG. 6 illustrates a communication network 600 depicting the lighting system 104 and the wireless charging station 400 in communication with an external communication device 602. The external communication device 602 may be selected from a group consisting of a mobile handheld device, a notebook PC, a desktop PC, a tablet, a Personal Digital Assistant (PDA) or the like. The lighting system 104 may be configured to communicate with the external communication device 602 through a communication interface operably connected with the processor and the memory unit of the lighting system 104. The lighting system 104 in that regard may be further configured to receive an input signal from the external communication device 602 and modify irradiation characteristics, such as intensity, frequency, illumination angle, etc. of the light source 203, in response to the input signal. In addition to the lighting system 104, the wireless charging station 400 may also be configured to communicate with the external communication device 602 through a second communication interface. The wireless charging station 400 may be configured to receive a second input signal from the external communication device 602, and may further be configured to modify charging characteristics such as magnetic field intensity, magnetic flux density, magnetic vector potential, etc. of the oscillating magnetic field, in response to the second input signal.

Figure 7:
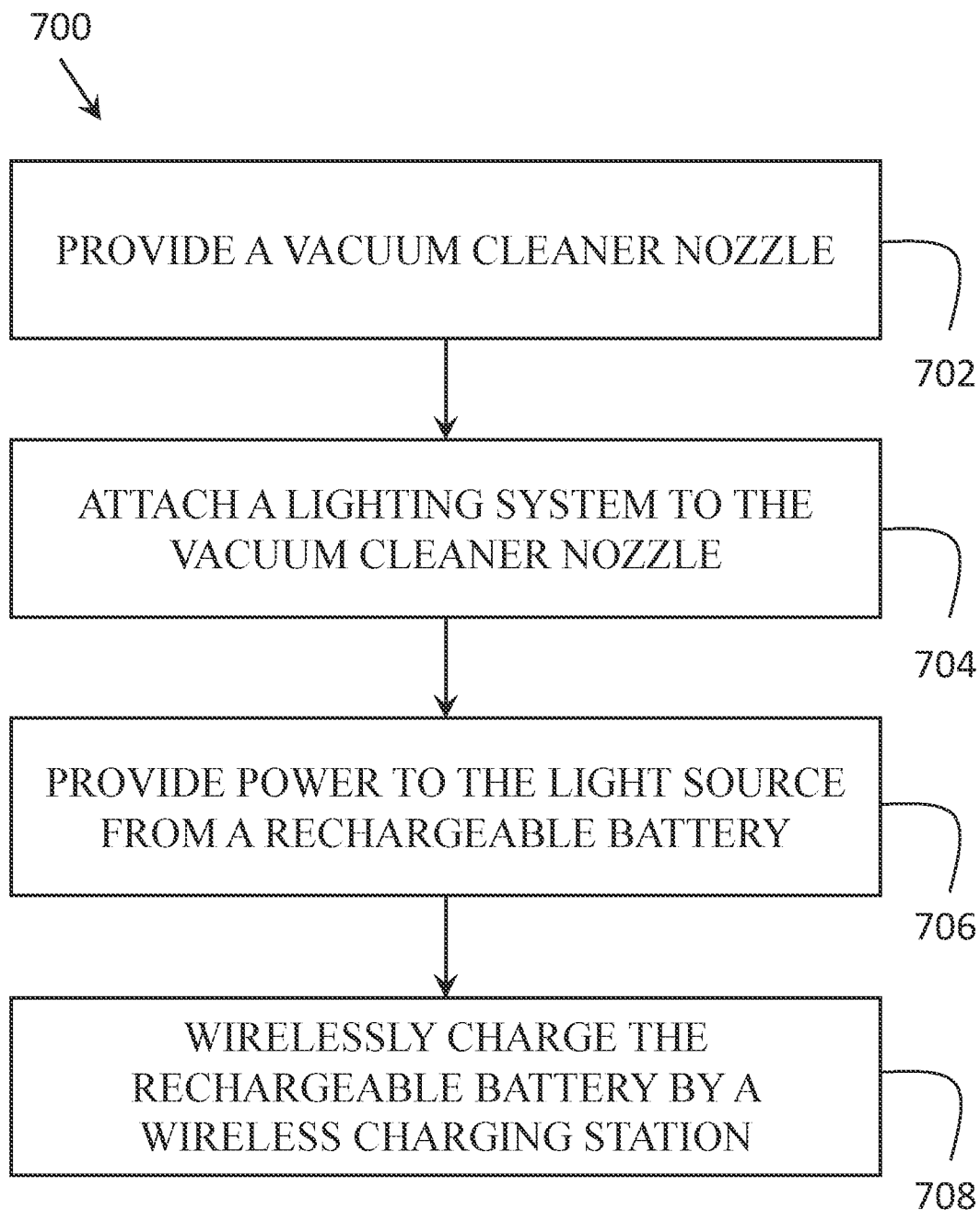
FIG. 7 illustrates a method for illuminating a surface to be cleaned, in accordance with an embodiment of the present invention.

FIG. 7 illustrates a method 700 for illuminating a surface to be cleaned, in accordance with an embodiment of the present invention. The method 700 begins at step 702 by providing the vacuum cleaner nozzle 102. The vacuum cleaner nozzle 102 may be fluidically coupled to a vacuum pump of a vacuum cleaner. At step 704, the lighting system 104 is attached to the vacuum cleaner nozzle 102. As introduced in the preceding discussion, the lighting system 104 includes a light source 203 including the one or more Light Emitting Diodes (LEDs) 205. Also, the lighting system 104 includes the electric circuit 204 electrically coupled to the light source 203. At step 706, the electric circuit 204 provides power to the light source 203 from the rechargeable battery 306. Further, at step 708, the rechargeable battery 306 is charged wirelessly by the wireless charging station 400.

In one embodiment of the invention, the electric circuit 204 sends a control signal to the light source 203 to change a color of light emanating from the one or more LEDs 205. In one embodiment of the invention, the electric circuit 204 changes the intensity of the illumination according to the ambient light. Further, in one embodiment of the invention, the electric circuit 204 communicates with the external communication device 602. In one embodiment of the invention, the electric circuit 204 receives the input signal from the external communication device 602. Further, the electric circuit 204 modifies the irradiation characteristics of the light source 203 in response to the received input signal.

The lighting system as described above through the aforementioned embodiments offers several benefits and advantageous effects. The lighting system is cheap to manufacture and easy to implement. The lighting system does need a major redesign of the readily available equipment and can be retrofitted to the readily available vacuum cleaner nozzles. The lighting system utilizes modem technologies such as wireless charging to enhance the functionality and convenience of utilization. The lighting system can be controlled remotely using a mobile handheld device providing a very familiar methodology for varying the characteristics of the lighting system for different applications.

Various modifications to these embodiments are apparent to those skilled in the art, from the description and the accompanying drawings. The principles associated with the various embodiments described herein may be applied to other embodiments. Therefore, the description is not intended to be limited to the embodiments shown along with the accompanying drawings but is to be providing the broadest scope consistent with the principles and the novel and inventive features disclosed or suggested herein. Accordingly, the invention is anticipated to hold on to all other such alternatives, modifications, and variations that fall within the scope of the present invention and appended claims.

The invention claimed is:

1. A lighting system attached to a vacuum cleaner nozzle, comprising:
    a light source including one or more Light Emitting Diodes (LEDs) adapted to illuminate a surface to be cleaned; and
    an electric circuit electrically coupled to the light source, the electric circuit configured to provide power to the light source from a rechargeable battery, wherein the rechargeable battery is configured to be wirelessly charged by a wireless charging station.

2. The lighting system as claimed in claim 1, wherein the wireless charging station comprises a power transmitting coil and the electric circuit comprises a power receiving coil.

3. The lighting system according to claim 1, wherein the one or more LEDs are configured to emit white light and/or full-color RGB (red/green/blue) light.

4. The lighting system according to claim 1, wherein the electric circuit is configured to send a control signal to the light source to change a color of light emanating from the one or more LEDs.

5. The lighting system according to claim 1, wherein the rechargeable battery is a lithium polymer battery.

6. The lighting system according to claim 1, wherein the wireless charging station uses Qi wireless charging or Bluetooth wireless charging method.

7. The lighting system according to claim 1, wherein the electric circuit is configured to dim or disable the light source while the rechargeable battery is being charged.

8. The lighting system according to claim 1, wherein the lighting system is made waterproof and dustproof.

9. The lighting system according to claim 1, wherein the light source and the electric circuit are integrated into a single printed circuit board affixed to the vacuum cleaner nozzle.

10. The lighting system according to claim 1, wherein the lighting system is detachably attached with the vacuum cleaner nozzle.

11. The lighting system according to claim 1, wherein the lighting system is adapted to change the illumination angle.

12. The lighting system according to claim 1, wherein the lighting system is adapted to communicate with an external communication device.

13. The lighting system according to claim 1, wherein the electric circuit is adapted to change an intensity of illumination according to ambient light.

14. The lighting system according to claim 1, wherein the light source automatically turns on when removed from the wireless charging station.

15. The lighting system according to claim 1, wherein the wireless charging station has a rechargeable battery unit.

16. A method for illuminating a surface to be cleaned, the method comprising:
    providing a vacuum cleaner nozzle; attaching a lighting system to the vacuum cleaner nozzle, the lighting system
    comprising a light source including one or more Light Emitting Diodes (LEDs), and an electric circuit electrically coupled to the light source; providing, by the electric circuit, power to the light source from a rechargeable battery; and charging, wirelessly, the rechargeable battery by a wireless charging station.

17. The method as claimed in claim 16, further comprising sending, by the electric circuit, a control signal to the light source to change a color of light emanating from the one or more LEDs.

18. The method as claimed in claim 16, further comprising changing, by the electric circuit, an intensity of illumination according to the ambient light.

19. The method as claimed in claim 16, further comprising communicating, by the electric circuit, with an external communication device.

20. The method as claimed in claim 19, further comprising receiving, by the electric circuit, an input signal from the external communication device, and modifying, by the electric circuit, irradiation characteristics of the light source in response to the received input signal.

* * * * *